US006965955B1

(12) United States Patent
Nishiyama

(10) Patent No.: US 6,965,955 B1
(45) Date of Patent: Nov. 15, 2005

(54) PERIPHERAL APPARATUS, CONTROL METHOD FOR PERIPHERAL APPARATUS, MEMORY MEDIUM, AND INFORMATION PROCESSING SYSTEM

(75) Inventor: Masaki Nishiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/532,076

(22) Filed: Mar. 21, 2000

(30) Foreign Application Priority Data

Mar. 29, 1999 (JP) .......................................... 11-085855
Mar. 9, 2000 (JP) ...................................... 2000-064721

(51) Int. Cl.[7] ................................................ G06F 13/12
(52) U.S. Cl. ............................. 710/72; 710/2; 710/306
(58) Field of Search ............................. 710/2, 72, 306; 707/10

(56) References Cited

U.S. PATENT DOCUMENTS 5,313,584 A * 5/1994 Tickner et al. ................ 710/37
5,459,870 A * 10/1995 Iwasa et al. ................ 710/261
5,987,526 A * 11/1999 Morales ...................... 709/249
6,088,346 A * 7/2000 Du et al. .................... 370/338
6,434,643 B1 * 8/2002 Ejiri ............................ 710/58

* cited by examiner

*Primary Examiner*—Jeffrey Gaffin
*Assistant Examiner*—Harold Kim
(74) *Attorney, Agent, or Firm*—Fitzpatrick, Cella, Harper & Scinto

(57) ABSTRACT

A peripheral apparatus, a control method for the peripheral apparatus, a memory medium, and an information processing system, in which performance of a connected host computer is not deteriorated are provided. For this purpose, when a status of the apparatus is a first status, a control mode is switched to the first mode such that in response to a data reading request which is issued from the host computer, when response data has been prepared, the response data is notified, and when the response data is not prepared yet, the fact that a response cannot be made is notified, and when the status of the apparatus is not the first status, the control mode is switched to the second mode such that in response to the data reading request which is issued from the host computer, the absence of the data to be responded is notified.

30 Claims, 12 Drawing Sheets

HOST 50
800
USB CABLE
60
PRINTER
SIE 700
(PRIOR ART)
500 600 1000 900
Bulk-Out FIFO
Bulk-In FIFO
SW
BLANK PACKET GENERATOR
10
400 300 200 100
PRINTER ENGINE
ROM
RAM
CPU

| | |
|---|---|
| EndPoint 0 | Control |
| EndPoint 1 | Bulk-Out |
| EndPoint 2 | Bulk-In |

FIG. 5

| Pin # | Pin assignments | Source |
|---|---|---|
| 1 | nStrobe | Host |
| 2—9 | Data | Bi-Di |
| 10 | nAck | Peripheral |
| 11 | Busy | Peripheral |
| 12 | PError | Peripheral |
| 13 | Select | Peripheral |
| 14 | nAutoFeed | Host |
| 15 | nFault | Peripheral |
| 16 | nInit | Host |
| 17 | nSelectIn | Host |
| 18—25 | Signal Ground | |

50 HOST
51
52
53
54
STATUS MONITOR
API LAYER
DRIVER LAYER
HOST CONTROLLER
USB CABLE
60 PRINTER
55
56
57
58
PRINT MECHANISM
FARMWARE
SIE (SERIAL I/F ENGINE)
HUB
UPSTREAM CONNECTOR
DOWNSTREAM CONNECTOR

403
DEVICE
404
TRANSCEIVER
405
R-CONTROLLER
R3
TWISTED
CABLE
401
DATA 1
DATA 2
402
REPEATER
404
TRANSCEIVER
R1
R2

PERIPHERAL APPARATUS, CONTROL METHOD FOR PERIPHERAL APPARATUS, MEMORY MEDIUM, AND INFORMATION PROCESSING SYSTEM

BACKGROUND OF THE INVENTION

1. Field of the Invention

The invention relates to a peripheral apparatus, a control method for the peripheral apparatus, a memory medium, and an information processing system, for notifying in response to a data reading request which is issued from a host computer.

2. Related Background Art

Hitherto, when a host receives data from a printer, for example, in the standard of the USB (Universal Serial Bus), a request of Bulk-In is issued. Generally, according to such a standard, in response to the request, the printer returns data or, if the data is not prepared, the printer returns an Nak.

However, in the conventional technique, for example, in a cheap printer, return data cannot be promptly returned during the printing or the like because of a limitation of hardware such that a CPU for performing communication of the USB and a CPU for performing a print control are the same. There are, consequently, big problems such that a fairly large number of Bulk-In and Nak intersect on a bus of the USB and a waste occurs and performance of a host PC (host personal computer) remarkably deteriorates due to the issue of the Bulk-In.

In a printer having dual I/F of the USB and IEEE1284 or the like, such a problem further becomes remarkable during the printing by IEEE1284.

SUMMARY OF THE INVENTION

It is, therefore, an object of the invention to provide a peripheral apparatus, a control method for the peripheral apparatus, a memory medium, and an information processing system, in which performance of a connected host computer is not deteriorated.

To accomplish the above object, according to the invention, there is provided a peripheral apparatus comprising:

- connecting means for connecting to a host computer;
- first means for, in response to a data reading request which is issued from the host computer, notifying the connecting means of response data in the case where the response data has been prepared and notifying the connecting means of the fact that a response cannot be made in the case where the response data is not prepared yet;
- second means for notifying the connecting means of the absence of data to be responded in response to the data reading request which is issued from the host computer; and
- switching means for switching the first and second means in accordance with a status of the peripheral apparatus.

According to the invention, there is also provided a peripheral apparatus comprising:

- first connecting means for connecting to a host computer;
- second connecting means for connecting to the host computer;
- first means for, in response to a data reading request which is issued from the host computer, notifying the first connecting means of response data in the case where the response data has been prepared and notifying the first connecting means of the fact that a response cannot be made in the case where the response data is not prepared yet;
- second means for notifying the first connecting means of the absence of data to be responded in response to the data reading request which is issued from the host computer; and
- switching means for switching to the second means in case of processing by using the second connecting means.

According to the invention, there is further provided a control method for a peripheral apparatus, comprising the steps of:

- when a status of the apparatus is a first status, switching a control mode to a first mode such that in response to a data reading request which is issued from a host computer, when response data has been prepared, the response data is notified, and when the response data is not prepared yet, the fact that a response cannot be made is notified; and
- when the status of the apparatus is not the first status, switching the control mode to a second mode such that in response to the data reading request which is issued from the host computer, the absence of data to be responded is notified.

According to the invention, there is further provided a control method for a peripheral apparatus, comprising the steps of:

- when a process using first connecting means is started, switching a control mode to a first mode such that the absence of data to be responded is notified to second connecting means in response to a data reading request which is issued from a host computer; and
- when the process using the first connecting means is finished, switching the control mode to a second mode such that in response to the data reading request which is issued from the host computer, when response data has been prepared, the response data is notified to the first connecting means and, when the response data is not prepared yet, the fact that the response cannot be made is notified to the first connecting means.

According to the invention, there is provided a memory medium which stores a program comprising the steps of:

- when a status of the apparatus is a first status, switching a control mode to a first mode such that in response to a data reading request which is issued from a host computer, when response data has been prepared, the response data is notified, and when the response data is not prepared yet, the fact that a response cannot be made is notified; and
- when the status of the apparatus is not the first status, switching the control mode to a second mode such that in response to the data reading request which is issued from the host computer, the absence of data to be responded is notified.

According to the invention, there is further provided a memory medium which stores a program comprising the steps of:

- when a process using first connecting means is started, switching a control mode to a first mode such that the absence of data to be responded is notified to second connecting means in response to a data reading request which is issued from a host computer; and
- when the process using the first connecting means is finished, switching the control mode to a second mode such that in response to the data reading request which is issued from the host computer, when response data has been prepared, the response data is notified to the first connecting means and, when the response data is not prepared yet, the fact that the response cannot be made is notified to the first connecting means.

According to the invention, there is provided an information processing system comprising a host computer and a peripheral apparatus, wherein the peripheral apparatus has:

connecting means for connecting to a host computer;

first means for, in response to a data reading request which is issued from the host computer, notifying the connecting means of response data in the case where the response data has been prepared and notifying the connecting means of the fact that a response cannot be made in the case where the response data is not prepared yet;

second means for notifying the connecting means of the absence of data to be responded in response to the data reading request which is issued from the host computer; and switching means for switching the first and second means in accordance with a status of the peripheral apparatus.

According to the invention, there is further provided an information processing system comprising a first host computer, a second host computer, and a peripheral apparatus, wherein the peripheral apparatus has:

first connecting means for connecting to the first host computer;

second connecting means for connecting to the second host computer;

first means for, in response to a data reading request which is issued from the host computer, notifying the first connecting means of response data in the case where the response data has been prepared and notifying the first connecting means of the fact that a response cannot be made in the case where the response data is not prepared yet;

second means for notifying the first connecting means of the absence of data to be responded in response to the data reading request which is issued from the host computer; and switching means for switching to the second means in case of processing by using the second connecting means.

BRIEF DESCRIPTION OF THE DRAWINGS

FIG. 5 is a diagram showing signal lines of IEEE1284;

DETAILED DESCRIPTION OF THE PREFERRED EMBODIMENTS

A printing apparatus of an embodiment according to the invention will now be described in detail hereinbelow with reference to the drawings. Although the USB is mentioned as communicating means for convenience of explanation, it will be understood that the invention can be also similarly embodied in other communicating means for performing packet communication. Although a printer is mentioned as a peripheral apparatus, the invention can be also similarly embodied in peripheral apparatuses such as scanner, facsimile, and the like.

(Embodiment 1)

Embodiments according to the invention will now be described in detail hereinbelow with reference to the drawings.

In the embodiment, pipes of Control, Bulk-In, and Bulk-Out are used in conformity with USB Printer Spec. 1.0. (Refer to FIG. 2 and refer to USB standard 1.00 for the definition of those pipes.) The Control pipe is mainly used for control of a printer reset or the like. Print data is transmitted to the printer by Bulk-Out. Bulk-In is used to return a status or the like of the printer to the host.

Figures 1, 2:
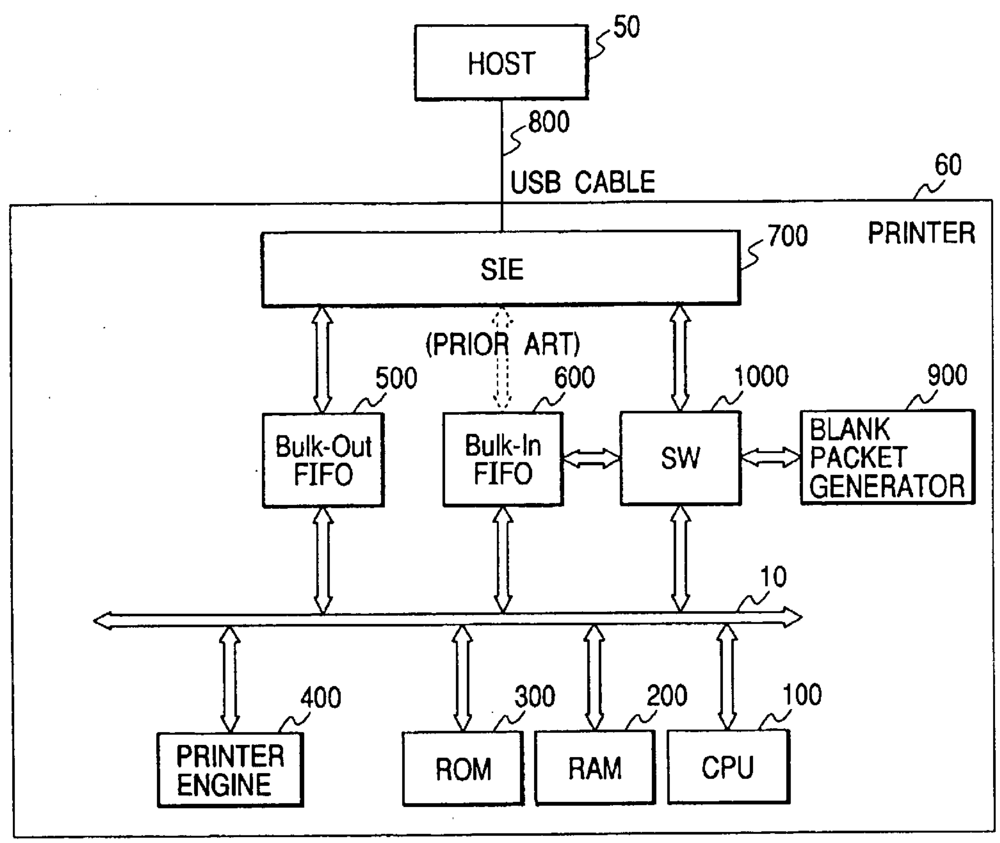
FIG. 1 is a constructional diagram of an embodiment 1.
FIG. 2 is a diagram showing a constructional diagram of USB EndPoint of the embodiment 1.
Figure 9:
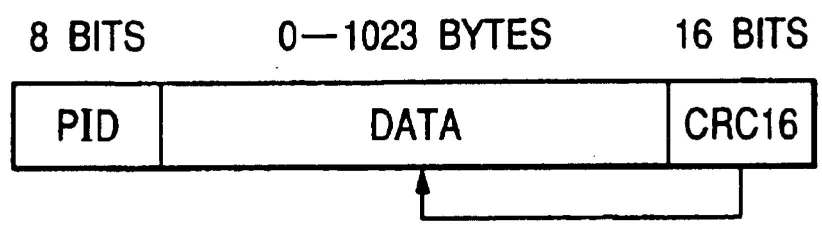
FIG. 9 is a diagram showing a data packet.
Figure 10:
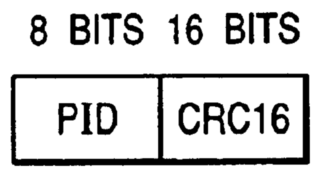
FIG. 10 is a diagram showing a blank packet.

FIG. 1 is a diagram showing a construction of the embodiment 1 of the invention. Reference numeral 50 denotes a host computer; 60 a printer; 100 a central processing unit (CPU) for controlling various processes; 200 a random access memory (RAM); 300 a read only memory (ROM) in which a control program regarding flowcharts, which will be explained hereinlater and a control program for the printer according to the invention are stored; 400 a printer engine; 500 a Bulk-Out FIFO for receiving print data which is supplied to the printer engine 400; 600 a Bulk-In FIFO for the Bulk-In pipe which is used for return data such as status information of the printer or the like shown in FIG. 9 to the host; 700 a serial interface engine (SIE) of the USB; and 800 a USB cable. In the conventional technique, the Bulk-In FIFO 600 is directly connected to the SIE 700. In the invention, a blank packet generator 900 for generating a blank packet shown in FIG. 10 and a switch 1000 for switching the Bulk-In FIFO 600 and blank packet generator 900 in accordance with an instruction from the CPU 100 are further provided. Reference numeral 10 denotes a system bus.

A control of the embodiment in the above construction will now be described with reference to the drawings.

An outline of the conventional technique will be first described. First, the print data from the host is encoded by a USB host controller (not shown) of a host machine and supplied as data of Bulk-Out onto a USB bus through the USB cable 800. The data is decoded by the SIE 700 and stored in the Bulk-Out FIFO 500. The CPU 100 obtains the data stored in the FIFO 500 and transfers it to the printer engine 400, so that the print is executed. In this way, the print data flows.

Figure 3:
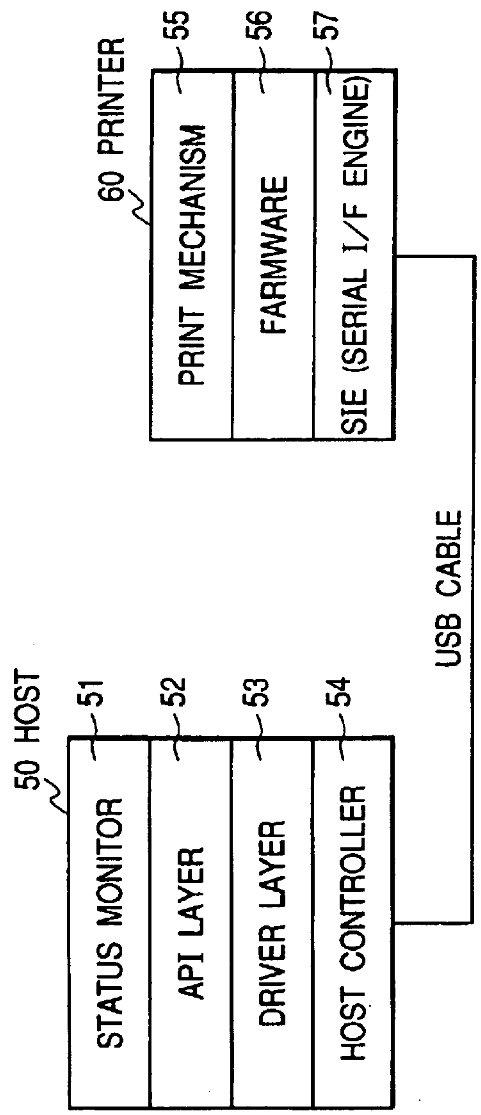
FIG. 3 is a diagram showing a software construction of a host PC and a printer.

A flow of the status information of the printer will now be described. Generally, the printer driver not only transmits the print data to the printer but also provides the printer status such as paper jam, absence of paper, or the like to the user. Such a function is controlled by a program called a status monitor. The status monitor periodically issues a status request to the printer in order to obtain the status. The status request issued as mentioned above is sent to the USB host controller via many Application Program Interfaces (API) which are provided by the Operating System (OS) and drivers (refer to FIG. 3). The status request becomes a Bulk-In request by the USB host controller and is issued onto the USB bus. The SIE 700 decodes the Bulk-In request and notifies the CPU 100 of the decoded request. The CPU 100 which detected the Bulk-In request stores the status of the printer engine 400 into the Bulk-In FIFO 600. Subsequently, the status data stored in the FIFO 600 is encoded by the SIE 700 and returned to the host through the USB cable 800. This data is decoded by the USB host controller and sent to the status monitor via the API/driver in order opposite to the order in case of the request. Finally, the status monitor also notifies the operator of the obtained data as a printer status by using the API for display.

Figure 11:
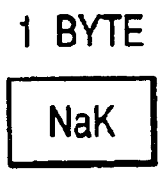
FIG. 11 is a diagram for explaining an Nak packet.

In the cheap printer, since the CPU 100 simultaneously executes the control of the printer engine and the process of the USB interface, there is a case where a response cannot be timely made to the Bulk-In request due to a problem on processing performance. In such a case, since there is no data in the Bulk-In FIFO 600, the SIE 700 returns an Nak (packet indicating that a response cannot be made because of a busy status) shown in FIG. 11 to the host in accordance with the USB standard. The USB host controller which received the Nak again automatically issues the Bulk-In request onto the USB bus. A waste such that the SIE 700 again returns the Nak in response to the issued Bulk-In and the USB host controller again issues the Bulk-In in response to this Nak windingly occurs. Further, for this interval, since the Nak is automatically processed in the host controller, the control is not returned to the status monitor, so that the status cannot be notified to the operator. The fact that there is a case where performance of the whole system deteriorates by up to about 50% in the USB host controller due to an overhead of the issue of the Bulk-In request is also reported.

The control of the invention will now be described in detail. In the invention, the Bulk-In FIFO 600 is not directly connected to the SIE but connected to the SIE through the switch 1000. The switch 1000 is also similarly connected to the blank packet generator 900 and controls the connection to the SIE 700 by an instruction from the CPU 100. In such a construction, when the print data is transmitted from the host PC, the data is first stored in the Bulk-Out FIFO 500 by the conventional technique. Although the CPU 100 executes the control of the printer engine in order to print this data, it previously operates the switch 1000 before the execution of the printer engine control and connects the blank packet generator 900 to the SIE 700. In the embodiment, the switching operation is performed by writing "01h" into an I/O port "80h" (a small letter 20. "h" denotes the hexadecimal notation) of the CPU 100.

When the engine control is finished, the CPU 100 again operates the switch 1000 (by writing "00h"into the I/O port "80h") and connects the Bulk-In FIFO 600 to the SIE 700.

Even when the CPU 100 received the Bulk-In request from the USB host controller during the control of the printer engine, since the blank packet generator has been connected to the SIE 700, a blank packet can be automatically returned in response to the request. The USB host controller which received the blank packet returns a signal indicative of the absence of reception data (NumofBytesRead=0) to a driver layer 53. Further, as for an API layer 52, the absence of reception data is also similarly returned to a status monitor 51. Unlike the conventional technique, since the control is returned to the status monitor, the status monitor can notify the operator of the absence of the reception data (usually, a busy status of the printer).

According to the invention, when the USB host controller receives the blank packet from the SIE 700, the transaction of the Bulk-In is finished, so that the degrading of the performance can be also avoided.

Figure 12:
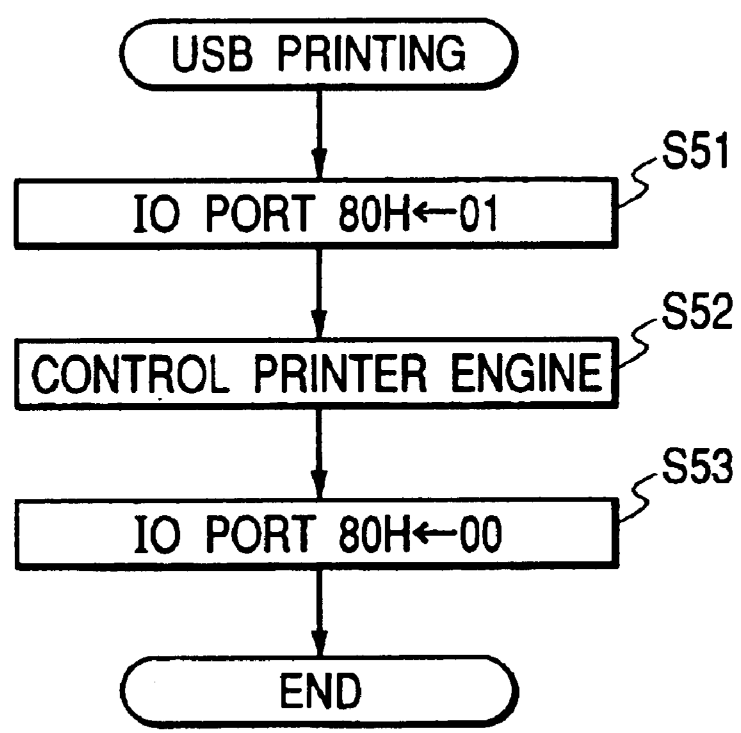
FIG. 12 is a diagram showing a print control flow of the embodiment 1.

FIG. 12 is a flowchart for the print control in the embodiment 1. This flow is executed at the timings when the print data is received and developed and the printer engine is activated to start the printing. First in step S51, "01" is written into the I/O port "80h". In step S52, the printer engine is controlled. However, the blank packet is returned by the writing in step S51 in response to the Bulk-In request under the control. When the engine control is finished, "00" is finally written into the I/O port "80h" in step S53 and the processing routine is finished.

The flow can be also executed at the timing when the print data is received from the host, the timing when the development of the print data is started, or the timing when the development of the print data is finished.

According to the invention as mentioned above, the excellent effects such that not only the printer status can be timely notified to the operator but also the degrading of the performance of the host PC can be avoided can be expected.

(Embodiment 2)

Figure 4:
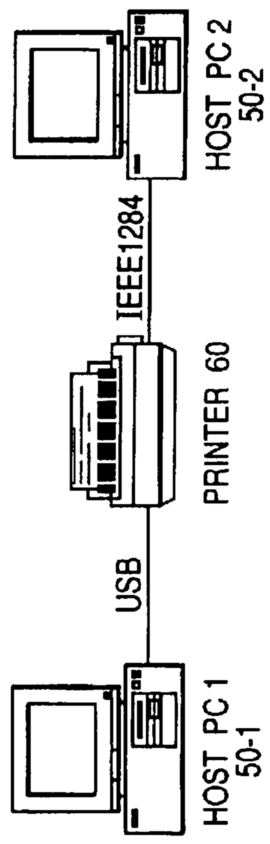
FIG. 4 is a constructional diagram of an embodiment 2.
Figure 14:
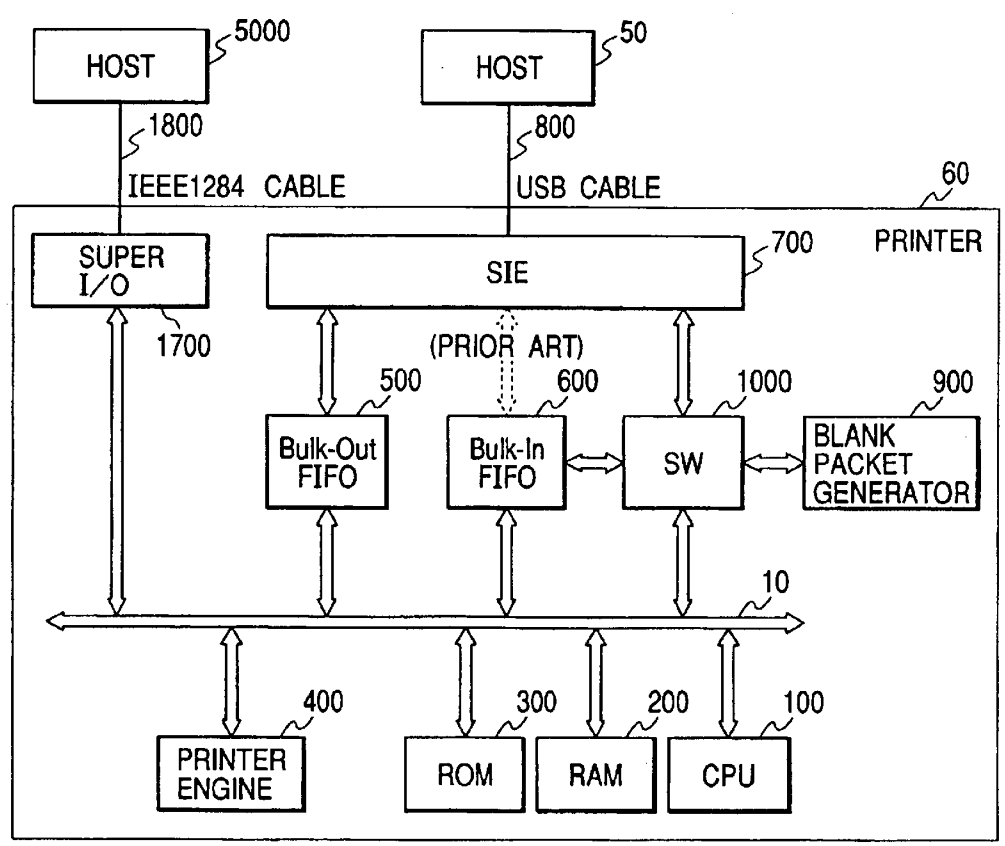
FIG. 14 is a diagram showing a construction of the embodiment 2.

FIG. 4 is a constructional diagram of the embodiment 2. A Centronics interface (IEEE1284) is further added to the construction of the embodiment 1, thereby enabling the printer to be shared by two host PCs. According to this construction, further typical effects of the invention can be obtained. FIG. 14 is a diagram showing a construction of the embodiment 2, in which a host computer 5000, a Centronics IEEE1284 cable 1800, and a Super I/O 1700 in which a plurality of interfaces such as Centronics interfaces or the like are united and enclosed in one chip are added. Particularly, the Super I/O 1700 supports a bidirectional communication such as ECP, EPP, or the like in case of the Centronics I/F and raises a communication speed by a method such as buffering or the like. The other construction is substantially the same as that of FIG. 1.

Generally, in case of the double interface as mentioned above, the interface used first has the priority and the other interface can be used after the end of a print job. That is, in case of this construction, a period of time when the apparatus cannot respond to the Bulk-In request from the host PC is very long (2 or 3 minutes or longer). (This is because, in case of the conventional technique, it is necessary that the CPU 100 executes not only the printer engine control but also the processes of the Centronics I/F and the apparatus cannot meet the Bulk-In request of the USB I/F until the end of the printing.) Specifically speaking, now assuming that the operator of a PC1 started the printing while a PC2 was using the Centronics I/F, although the status request of the status monitor is issued as Bulk-In onto the USB bus, this request is returned by Nak until the end of the print job of the PC2 (usually, for 2 to 3 minutes), so that the performance of the host PC1 is remarkably deteriorated. Since the control is not returned to the status monitor as already described in the embodiment 1, the busy status of the printer is not notified to the operator of the host PC1 during this period of time.

When the invention is applied, it will be easily understood that it is sufficient to connect the blank packet generator to the SIE 700 by operating the switch 1000 prior to starting the printing by the Centronics I/F. Thus, even in the printing by the Centronics I/F, the blank packet can be timely returned, the performance of the host PC1 is not deteriorated, and the busy status of the printer can be also notified to the operator. Finally, after completion of the printing by the Centronics I/F, it is sufficient to return the switch 1000 to the Bulk-In FIFO 600. On the contrary, while the host PC1 is using the USB I/F in order to prepare for the next print job, the busy status of the printer is notified to the host PC2 by setting the busy status of the Centronics I/F of the printer to the high level by the conventional technique (refer to FIGS. 4 and 5).

Figure 13:
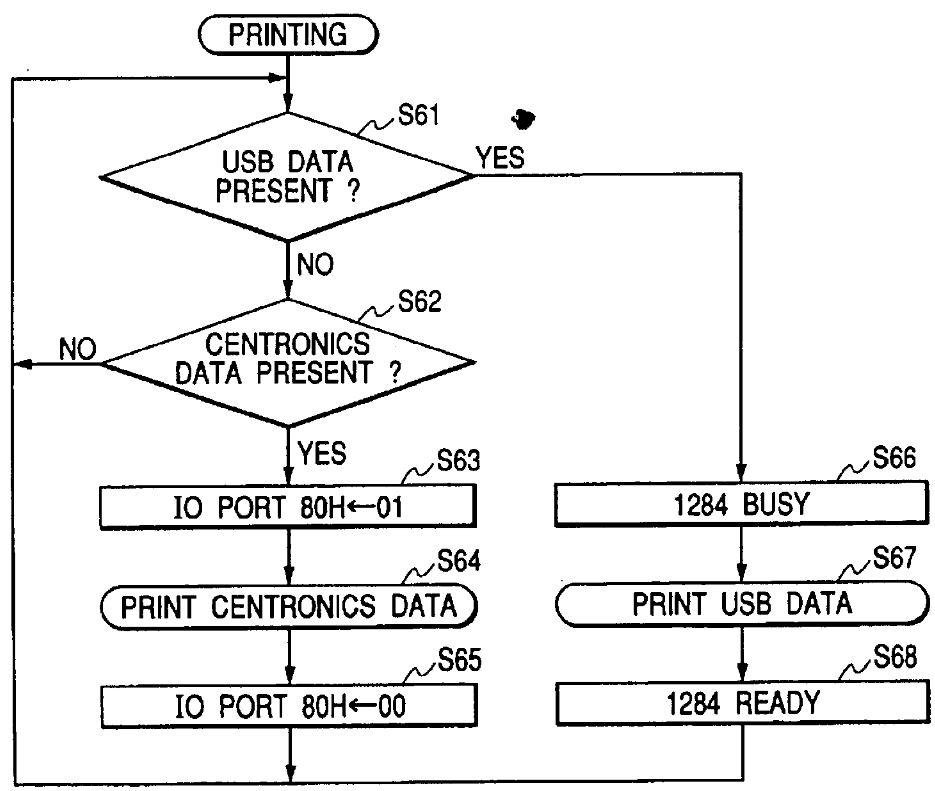
FIG. 13 is a diagram showing a print control flow of the embodiment 2.
Figure 16:
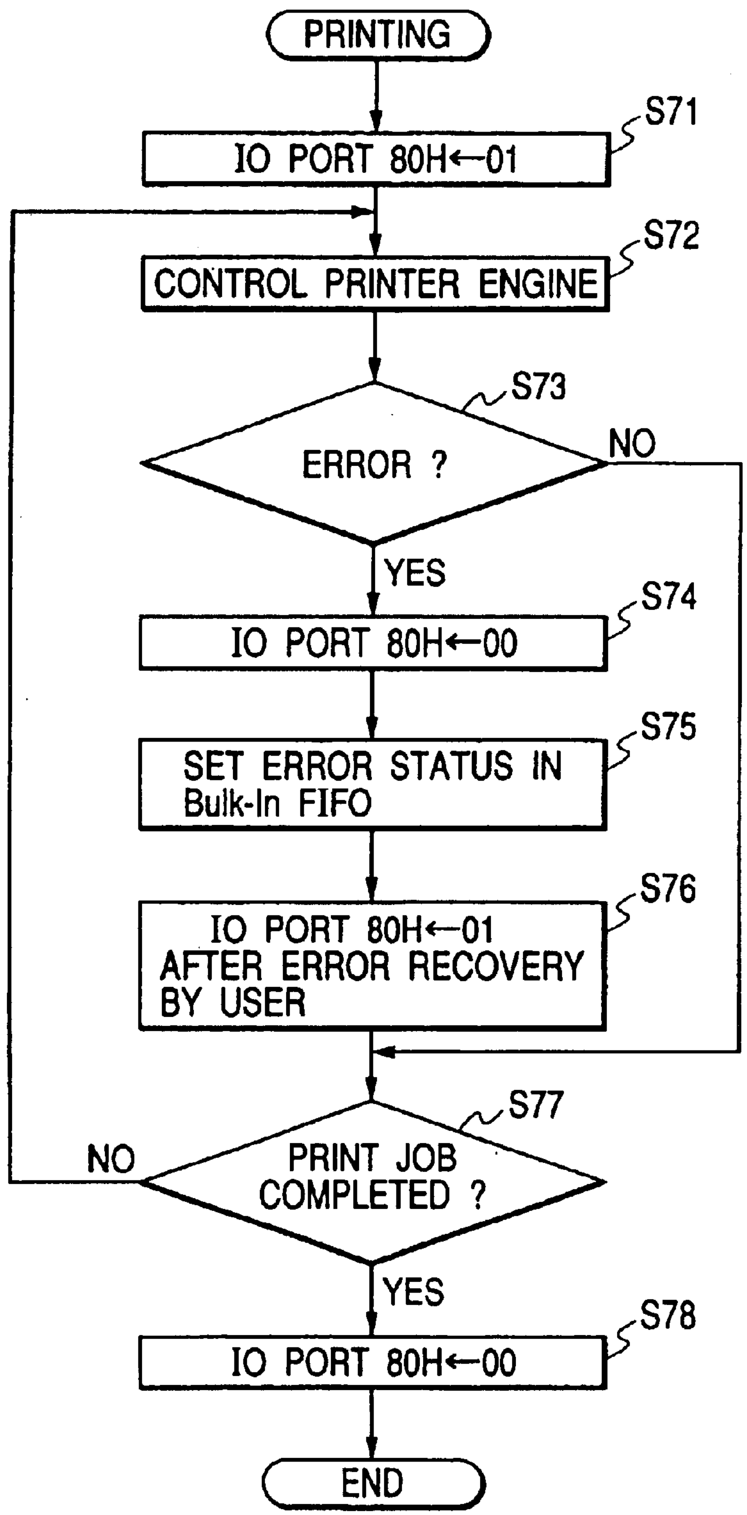
FIG. 16 is a diagram showing a print control flow of the embodiment 5.

FIG. 13 is a flowchart for the print control of the embodiment 2. First, in step S61, whether data exists in the Bulk-Out FIFO of the USB or not is discriminated. If YES, step S66 follows and whether Centronics data exists or not is discriminated in step S62. If NO, the processing routine is returned to step S61. If YES in step S62, “01” is written into the I/O port “80h” in step S63. The printing process of the Centronics data is completed in step S64. In step S65, “00h” is written into the I/O port “80h” and the processing routine is returned to step S61. If YES in step S61, the Centronics I/F is set to a busy status (#11pin —high) in step S66. In step S67, the print job via the USB I/F is completed (the processes in FIGS. 12 and 16 are executed). In step S68, the Centronics I/F is set to a ready status (#11—low) and the processing routine is returned to step S61. Even when the print job arrives via the USB I/F during the Centronics printing, since a response to the Bulk-In request indicates the blank packet in step S63, no Nak is generated, thereby making it possible to notify the operator of the fact that the printer is busy. Similarly, since the Centronics I/F becomes busy in step S66 during the USB printing, the busy status can be also notified to the operator. (Although the timeout is used as usual means for discriminating the busy status of the Centronics I/F, since it is the well-known technique, its detailed description is omitted here.)

(Embodiment 3)

Figure 6:
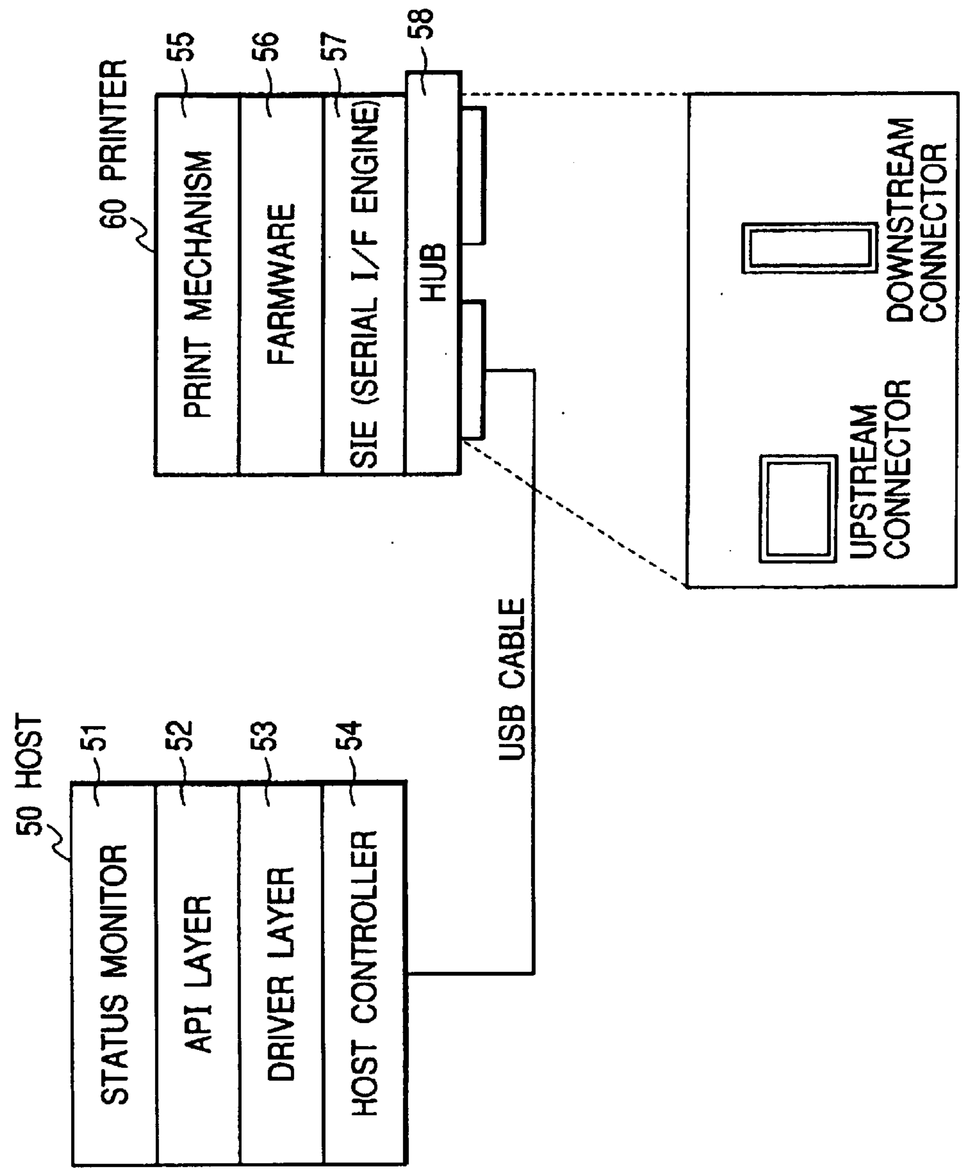
FIG. 6 is a constructional diagram of an embodiment 3.

FIG. 6 is a constructional diagram of the embodiment 3. It differs from the embodiment 1 with respect to a point that the HUB function is provided in the printer and the printer can be further attached to its own downstream.

(Embodiment 4)

In the embodiment 4, the cable which is connected to the upstream and the downstream in the embodiment 1 can be connected or disconnected in a current supplying state. Since a construction is substantially similar to that of the embodiment 1, its detailed description is omitted. The embodiment 4 will now be described in detail hereinbelow with reference to the drawings.

Figure 7:
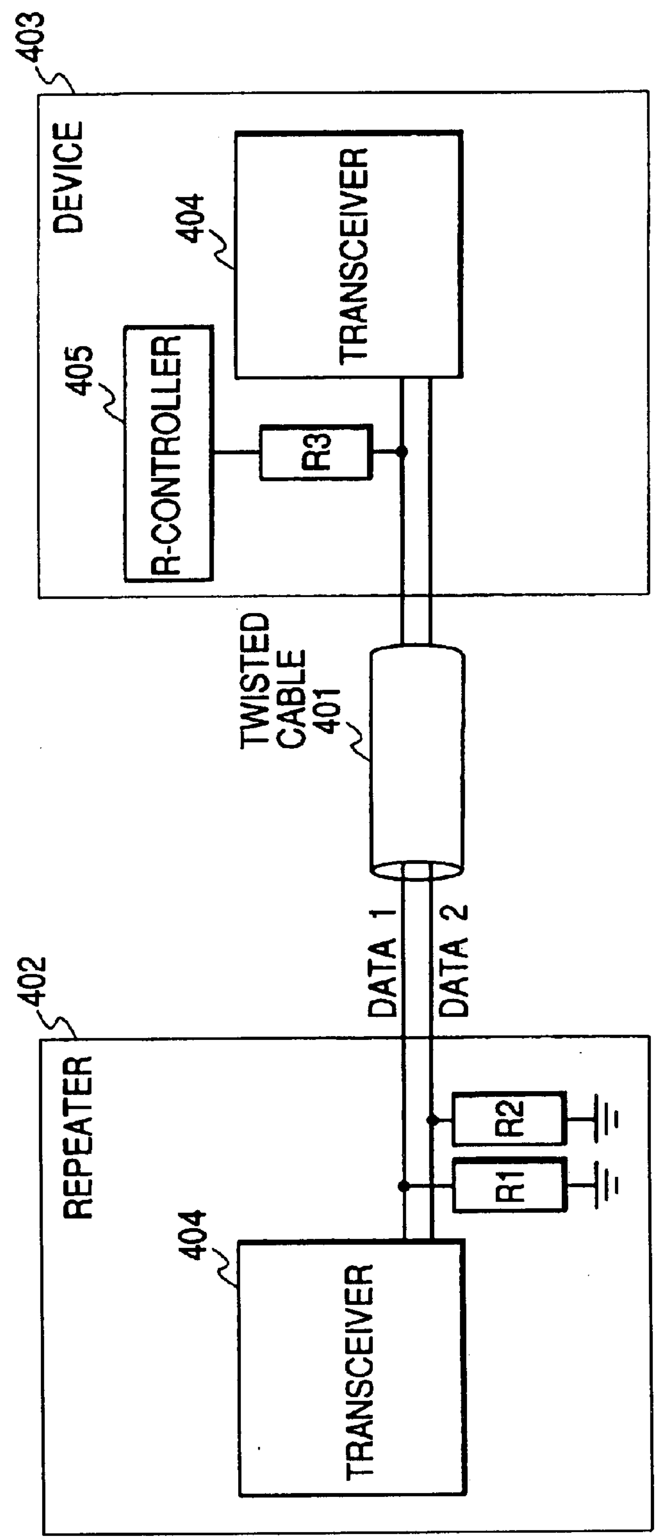
FIG. 7 is a diagram showing communication signal lines and their drivers of an embodiment 4.

FIG. 7 is a diagram showing signal lines for constructing a communicating apparatus of the invention and their drivers. A shield twisted cable 401 (hereinafter, abbreviated to a cable 401) comprising signal lines data1 and data2 couples a repeater side 402 of the hub and a device side 403 (hub or node). In detail, each signal line is connected to a transceiver 404 and electrically transmits or receives data. Resistors R1 and R2 are connected to the signal lines and prevent the signal lines from being set to the high impedance.

Each transceiver 404 has therein a differential amplifying type input/output device, a port for reading a voltage of each signal line, a serial/parallel converter, and the like and controls electric signals of the signal lines data1 and data2. The signal lines data1 and data2 can serially transmit a control signal of a PC 102 and a signal from a node 104 in accordance with a predetermined protocol.

In the invention, when no signal is transmitted and received, if the signal line data1 is at the high level and the signal line data2 is at the low level, this means that an apparatus is connected to one end (node side) of the network, and if the signal line data1 is at the low level and the signal line data2 is at the low level, this means that an apparatus is not connected.

In the device 403, the signal line data1 is connected to an R-controller 405 through a resistor R3.

Figure 8A:
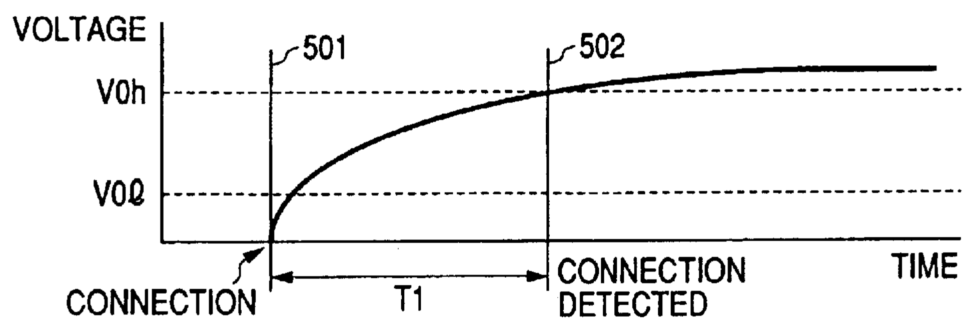
FIGS. 8A and 8B are diagrams showing timings for connection and disconnection of a cable 401 and voltage changes of data1.
Figure 8B:
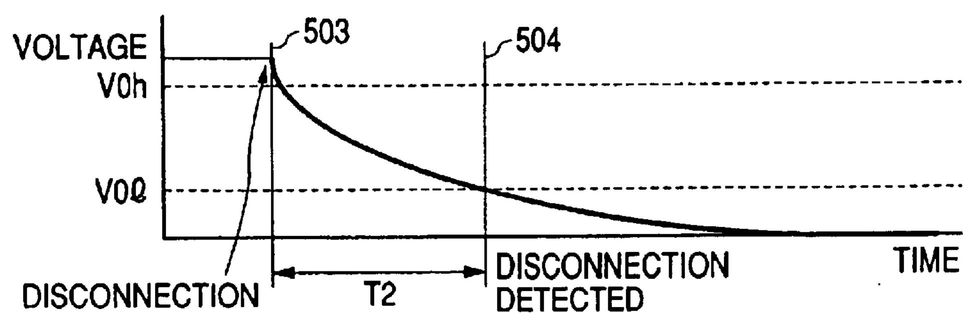

FIGS. 8A and 8B show timings for connecting and disconnecting the cable 401 and voltage changes of the signal line data1.

VOl and VOh used in the diagrams indicate low and high detectable voltages of the port connected to the signal line data1 of the host 402, respectively.

FIG. 8A is a diagram showing a connecting sequence.

Reference numeral 501 denotes that the cable 401 has been connected. In this instance, the R-controller 405 connected to the resistor R3 generates a voltage of 5V and the voltage of the signal line data1 rises in accordance with a wiring capacitance of the resistor R3 and cable 401. The voltage of the signal line data1 exceeds VOh after the elapse of a certain time T1 (time point 502), so that it is possible to recognize that the port input is at the high level. Therefore, it is possible to detect that a device has been connected to the downstream port.

FIG. 8B is a diagram showing a disconnecting sequence of the cable 401.

Reference numeral 503 denotes that the cable 401 has been disconnected. The voltage of the signal line data1 drops in accordance with a wiring capacitance of the resistor R1 and the signal line data1. The voltage of the signal line data1 exceeds Vol after the elapse of a certain time T2 (time point 504), so that it is possible to recognize that the port input is at the low level. Therefore, it is possible to detect that the device has been disconnected from the downstream port.

(Embodiment 5)

An example in which processes at the time of occurrence of an error are added to the embodiment 1 of the invention will now be described with reference to FIGS. 15 and 16.

Figure 15:
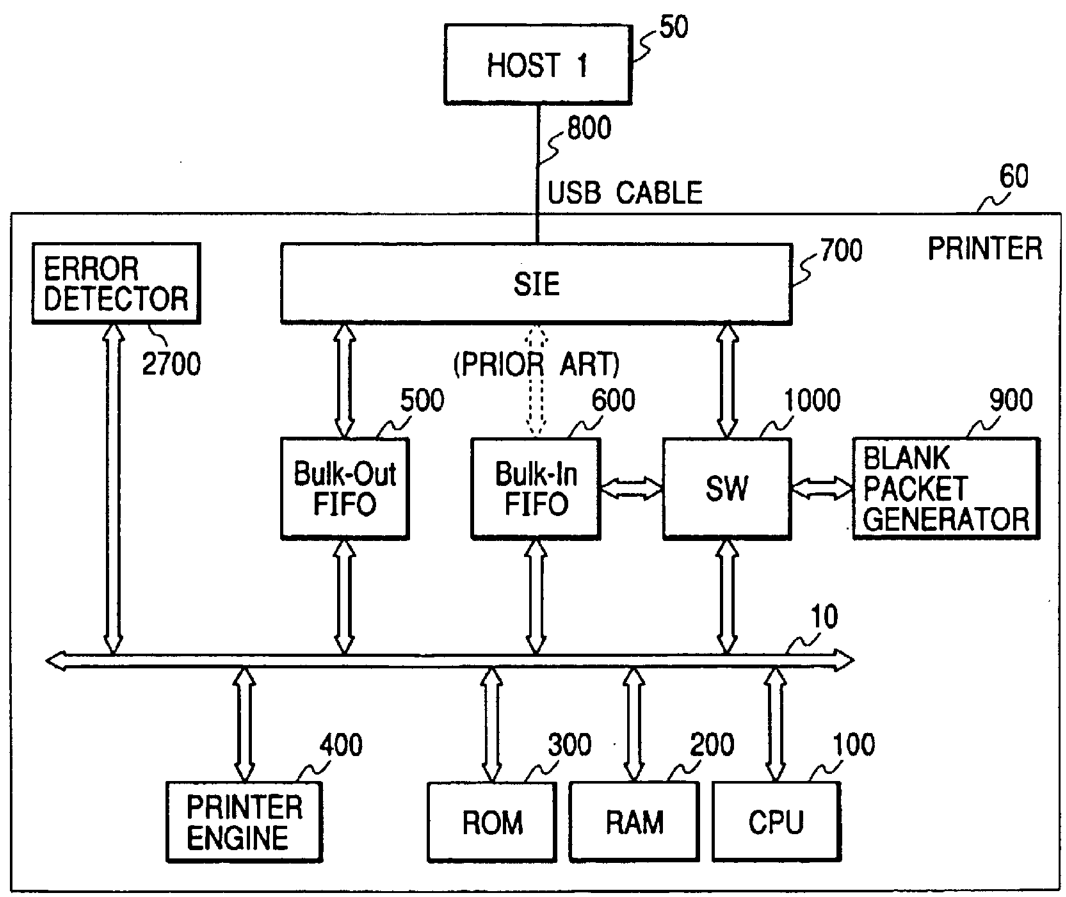
FIG. 15 is a constructional diagram of an embodiment 5.

FIG. 15 shows a constructional example and is formed fundamentally by adding an error detector 2700 to the construction of FIG. 1.

In the embodiment of the invention, the Bulk-In FIFO 600 is not directly connected to the SIE but connected to the SIE through the switch 1000.

The switch 1000 is also similarly connected to the blank packet generator 900 and controls the connection to the SIE 700 by an instruction from the CPU 100. In such a construction, when print data is transmitted from the host PC, the data is first stored in the Bulk-Out FIFO 500 by the conventional technique.

Although the CPU 100 executes the printer engine control in order to print the print data, it previously operates the switch 1000 prior to executing the printer engine control so as to connect the blank packet generator 900 to the SIE 700. In the embodiment, the switching operation is performed by writing “01h” into the I/O port “80h” (a small letter “h” indicates the hexadecimal notation) of the CPU 100. When the engine control is finished, the CPU again operates the switch 1000 (by writing “00h” into the I/O port “80h”) so as to connect the Bulk-In FIFO 600 to the SIE 700. When an error occurs during the engine control, the CPU 100 also operates the switch 1000 (by writing "00h" into the I/O port "80h") in response to an output of the error detector 2700, thereby enabling an error status to be transmitted from the Bulk-In FIFO to the host.

A control flow will now be described with reference to FIG. 16. A control program regarding the flowchart of FIG. 16 is stored in the ROM 300 and executed by the CPU 100.

First, "01" is written into the I/O port "80h" in step S71.

In step S72, the printer engine is controlled on the basis of the data received from the host.

In step S73, whether an error such as a paper jam or the like has occurred or not is discriminated. When no error occurs, step S77 follows. When the error occurs, step S74 follows.

In step 574, "00" is written into the I/O port "80h".

In step S75, an error status (paper jam or the like) is stored into the Bulk-In FIFO.

In step S76, the apparatus waits for an error recovery by the user and, after completion of the recovery, "01" is again written into the I/O port "80h".

In step S77, whether the print job has been completed or not is discriminated. If NO, the processing routine is returned to step S72. If YES, step S78 follows.

In step S78, "00" is finally written into the I/O port "80h" and the processing routine is finished.

The operation of the host computer 50 will now be described. The status monitor issues the Bulk-In request at a predetermined period (for example, 500 msec).

Even if the Bulk-In request is received from the USB host controller while the CPU 100 is controlling the printer engine, since the blank packet generator has been connected to the SIE 700, the blank packet can be automatically returned in response to the request. The USB host controller which received the blank packet returns a signal indicative of the absence of the reception data (NumofBytesRead=0) to the driver layer 53. Further, the API layer 52 also similarly returns the signal indicative of the absence of the reception data to the status monitor 51. Unlike the conventional technique, since the control is returned to the status monitor, the status monitor can notify the operator of the absence of the reception data (usually, the normal print).

According to the embodiment as mentioned above, excellent effects such that not only the printer status can be timely notified to the operator but also, even when an error occurs, the error status can be immediately notified to the user can be expected.

The process in step S71 can be also executed at a timing when the print data is received from the host, the timing when the development of the print data is started, or the timing when the development of the print data is finished.

(Other embodiments)

The invention is not limited to the kind of network but can be applied to networks of various interfaces. For example, the invention can be applied to interfaces called USB or IEEE1394. It will be also obviously understood by those having the ordinary skill in the art that the invention can be similarly applied to not only printers but also another information apparatuses such as facsimile apparatuses having a printer engine, scanners where the printer engine is replaced with a scanner engine.

In the peripheral apparatus which can notify the information processing apparatus of a busy status (Nak packet), by providing the means for showing that the absence of the communication information (packet without response data) other than the busy status and the means which can exclusively select the busy status and the absence of the communication information, a large effect such that the vain requests and busy status on the communication bus can be omitted can be expected. Further, an excellent effect such that the status of the information processing apparatus can be timely notified to the operator can be also expected.

According to the invention as described in detail above, it is possible to provide the peripheral apparatus, the control method for the peripheral apparatus, the memory medium, and the information processing system, in which the vain data reading request which is issued from the host apparatus can be omitted and the performance of the host computer is not deteriorated.

Further, it is possible to provide the peripheral apparatus, the control method for the peripheral apparatus, the memory medium, and the information processing system, in which the status can be timely notified to the operator while omitting the vain requests on communication.

What is claimed is:

1. A peripheral apparatus comprising:

connecting means for connecting to a host computer;

first means for, in response to a data reading request which is issued from the host computer, notifying said connecting means of response data in a case where the response data has been prepared and notifying said connecting means of the fact that a response cannot be made in a case where the response data is not prepared yet;

second means for notifying said connecting means of the absence of data to be sent in response to the data reading request which is issued from the host computer; and switching means for switching said first means and said second means in accordance with a status of the said peripheral apparatus.

2. An apparatus according to claim 1, further comprising second connecting means different from said connecting means, and wherein, in a case of processing data from said second connecting means, said switching means switches to said second means.

3. An apparatus according to claim 2, wherein said connecting means is connected to the host computer through a cable which conforms with a USB standard or an IEEE1394 standard, and said second connecting means is connected to the host computer through a cable which conforms with an IEEE1284 standard.

4. An apparatus according to claim 1, wherein said connecting means is connected to the host computer through a cable which conforms with a USB standard or an IEEE1394 standard.

5. An apparatus according to claim 1, wherein said first means notifies of the response data by a data packet, and said second means notifies of the fact that said response cannot be made by an Nak packet, and notifies of the absence of the data to be sent by a blank packet.

6. An apparatus according to claim 1, wherein said peripheral apparatus includes a printer.

7. An apparatus according to claim 6, wherein said switching means switches to said second means at a timing when a printer engine or a scanner engine operates.

8. An apparatus according to claim 6, wherein said switching means switches to said second means at a timing when print data is received, a timing when a development of the print data is started, or a timing when the development of the print data is finished.

9. An apparatus according to claim 1, wherein said peripheral apparatus includes a scanner.

10. An apparatus according to claim 1, wherein said peripheral apparatus includes a facsimile.

11. An apparatus according to claim 1, wherein said switching means switches to said second means at a timing when an engine control is performed, when the data is received, when a development of the data is started, or when the development of the data is finished, switches to said first means when an error occurs, switches to said second means when the error is recovered, and switches to said first means when a job is finished, and after switching to said first means when the error occurs, error information is sent to said connecting means.

12. A control method for a peripheral apparatus, comprising the steps of:

when a status of the apparatus is a first status, switching a control mode to a first mode such that in response to a data reading request which is issued from a host computer, when response data has been prepared, the response data is notified, and when the response data is not prepared yet, the fact that a response cannot be made is notified; and when the status of the apparatus is not the first status, switching the control mode to a second mode such that in response to the data reading request which is issued from the host computer, the absence of data to be sent is notified.

13. A method according to claim 12, wherein, in a case of processing data from a second host, the control mode is switched to the second mode.

14. A method according to claim 12, wherein the response data is notified by using a data packet, the fact that the response cannot be made is notified by using an Nak packet, and the absence of the data to be responded is notified by using a blank packet.

15. A method according to claim 12, wherein the control mode is switched to the second mode at a timing when a printer engine or a scanner engine operates.

16. A method according to claim 12, wherein the control mode is switched to the second mode at a timing when print data is received, a timing when a development of the print data is started, or a timing when the development of the print data is finished.

17. A method according to claim 12, wherein the control mode is switched to the second mode when an engine control is performed, when data is received, when a development of the data is started, or when the development of the data is finished, is switched to the first mode when an error occurs, is switched to the second mode when the error is recovered, and is switched to the first mode when a job is finished, and after the control mode is switched to the first mode when the error occurs, error information is notified.

18. A computer-readable memory medium which stores a program, the program comprising the steps of:

when a status of the apparatus is a first status, switching a control mode to a first mode such that in response to a data reading request which is issued from a host computer, when response data has been prepared, the response data is notified, and when the response data is not prepared yet, the fact that a response cannot be made is notified; and when the status of the apparatus is not the first status, switching the control mode to a second mode such that in response to the data reading request which is issued from the host computer, the absence of data to be responded is notified.

19. A medium according to claim 18, wherein, in a case of processing data from a second host, the control mode is switched to the second mode.

20. A medium according to claim 18, wherein said medium stores a program such that the response data is sent by using a data packet, the fact that the response cannot be made is notified by using an Nak packet, and the absence of the data to be sent is notified by using a blank packet.

21. A medium according to claim 18, wherein said medium stores a program for switching the control mode to the second mode at a timing when a printer engine or a scanner engine operates.

22. A medium according to claim 18, wherein said medium stores a program for switching the control mode to the second mode at a timing when print data is received, a timing when a development of the print data is started, or a timing when the development of the print data is finished.

23. A medium according to claim 18, wherein said medium stores a program such that the control mode is switched to the second mode when an engine control is performed, when data is received, when a development of the data is started, or when the development of the data is finished, is switched to the first mode when an error occurs, is switched to the second mode when the error is recovered from, and is switched to the first mode when a job is finished, and after the control mode is switched to the first mode when the error occurs, error information is notified.

24. An information processing system comprising:

a host computer; and a peripheral apparatus, wherein said peripheral apparatus comprises:

connecting means for connecting to said host computer;

first means for, in response to a data reading request which is issued from said host computer, notifying said connecting means of response data in the case where the response data has been prepared and notifying said connecting means of the fact that a response cannot be made in the case where the response data is not prepared yet;

second means for notifying said connecting means of the absence of data to be sent in response to the data reading request which is issued from said host computer; and switching means for switching said first means and said second means in accordance with a status of said peripheral apparatus.

25. A peripheral apparatus comprising:

a connecting unit, adapted to connect to a host computer;

a first control unit adapted to, in response to a request which is issued from the host computer, control said connecting unit to notify the host computer of response data in a case where the response data has been prepared and to control said connecting unit to notify the host computer of the fact that a response cannot be made in a case where the response data is not prepared yet;

a second control unit, adapted to, in response to a request which is issued from the host computer, control said connecting unit to notify the host computer of the absence of data to be sent; and a switching unit, adapted to switch said first control unit and said second control unit in accordance with a status of said peripheral apparatus.

26. An apparatus according to claim 25, further comprising a second connecting unit, which is different from said connecting unit, for connecting a host computer, wherein, a case of processing data from said second connecting unit, said switching unit switches to said second control unit.

27. An apparatus according to claim 25, wherein said first control unit notifies the host computer of response data by a data packet, notifies the host computer of the fact that the response cannot be made by an Nak packet, and notifies the host computer of the absence of the data to be sent by a blank packet.

28. A peripheral apparatus comprising:

a connecting unit, adapted to connect to a host computer;

a first control unit, adapted to, in response to a request which is issued from the host computer, control said connecting unit to send response data to the host computer in a case where the response data has been prepared and to control said connecting unit to notify the host computer of the fact that a response cannot be made in a case where the response data is not prepared yet;

a second control unit, adapted to, in response to a request which is issued from the host computer, control said connecting unit to send a blank packet to the host computer; and a switching unit, adapted to switch said first control unit and said second control unit in accordance with a status of said peripheral apparatus.

29. A method of operation of a peripheral apparatus that has a connecting unit and first and second control units, said method comprising the steps of:

connecting to a host computer, using the connecting unit;

in response to a request which is issued from the host computer, the first control unit controlling the connecting unit to notify the host computer of response data in a case where the response data has been prepared and controlling the connecting unit to notify the host computer of the fact that a response cannot be made in a case where the response data is not prepared yet;

in response to a request which is issued from the host computer, the second control unit controlling the connecting unit to notify the host computer of the absence of data to be sent; and switching the first control unit and the second control unit in accordance with a status of the peripheral apparatus.

30. A method of oeprating a peripheral apparatus that has a connecting unit and first and second control units, said method comprising the steps of:

connecting to a host computer;

in response to a request which is issued from the host computer, the first control unit controlling the connecting unit to send response data to the host computer in a case where the response data has been prepared and controlling the connecting unit to notify the host computer of the fact that a response cannot be made in the case where the response data is not prepared yet;

in response to a request which is issued from the host computer, the second control unit controlling the connecting unit to send blank packet to the host computer; and switching the first control unit and the second control unit in accordance with a status of the peripheral apparatus.

* * * * *

UNITED STATES PATENT AND TRADEMARK OFFICE

CERTIFICATE OF CORRECTION

PATENT NO. : 6,965,955 B1
DATED : November 15, 2005
INVENTOR(S) : Masaki Nishiyama It is certified that error appears in the above-identified patent and that said Letters Patent is hereby corrected as shown below:

Column 5,
Line 40, "windingly" should read -- repeatedly --;
Line 61, delete "20.".

Column 9,
Line 57, "another" should read -- other --.

Column 14,
Line 11, "oeprating" should read -- operating --.

Signed and Sealed this

Thirtieth Day of May, 2006

JON W. DUDAS
*Director of the United States Patent and Trademark Office*